United States Patent [19]

Tilders et al.

[11] Patent Number: 4,962,617

[45] Date of Patent: Oct. 16, 1990

[54] PORTABLE HANDHELD POWER-DRIVEN TOOL

[75] Inventors: Benno Tilders, Waiblingen; Michael Leuchte, Stuttgart, both of Fed. Rep. of Germany

[73] Assignee: Andreas Stihl, Waiblingen, Fed. Rep. of Germany

[21] Appl. No.: 522,783

[22] Filed: May 14, 1990

[30] Foreign Application Priority Data

May 20, 1989 [DE] Fed. Rep. of Germany ....... 3916433

[51] Int. Cl.$^5$ .......................................... B24B 23/02
[52] U.S. Cl. ................................ 51/170 PT; 51/266; 123/41.7; 123/179 SE
[58] Field of Search ........... 51/170 R, 170 PT, 170 T, 51/241 LG, 266; 30/166 R, 388, 390, 391; 125/13.1; 123/41.65, 41.7, 179 SE, 185 A, 185 B, 185 BA, 185 R

[56] References Cited

U.S. PATENT DOCUMENTS

| | | | |
|---|---|---|---|
| 2,895,466 | 7/1959 | Mall et al. | 123/185 BA |
| 3,566,848 | 3/1971 | Dobbertin et al. | 123/41.65 |
| 3,735,489 | 5/1973 | Zatorsky | 30/390 |
| 3,855,976 | 12/1974 | Notaras et al. | 123/41.7 |
| 4,620,367 | 11/1986 | Tubesing | 51/170 PT |

FOREIGN PATENT DOCUMENTS 108826 6/1984 Japan .......................... 123/179 SE Primary Examiner—Roscoe V. Parker
Attorney, Agent, or Firm—Walter Ottesen

[57] ABSTRACT

This disclosure is directed to a portable handheld power-driven tool such as a cutoff machine. The cutoff machine includes an engine having a drive shaft. A drive wheel for the work tool is provided at one end of the drive shaft and a fan wheel for moving cooling air to the engine is mounted at the other end of the drive shaft. A pull rope starter is mounted at the power takeoff end of the drive shaft so that it lies outside of the flow of cooling air. In this way, abrasive dust is prevented from accumulating on the pull rope starter and its operational service life is significantly increased.

6 Claims, 3 Drawing Sheets

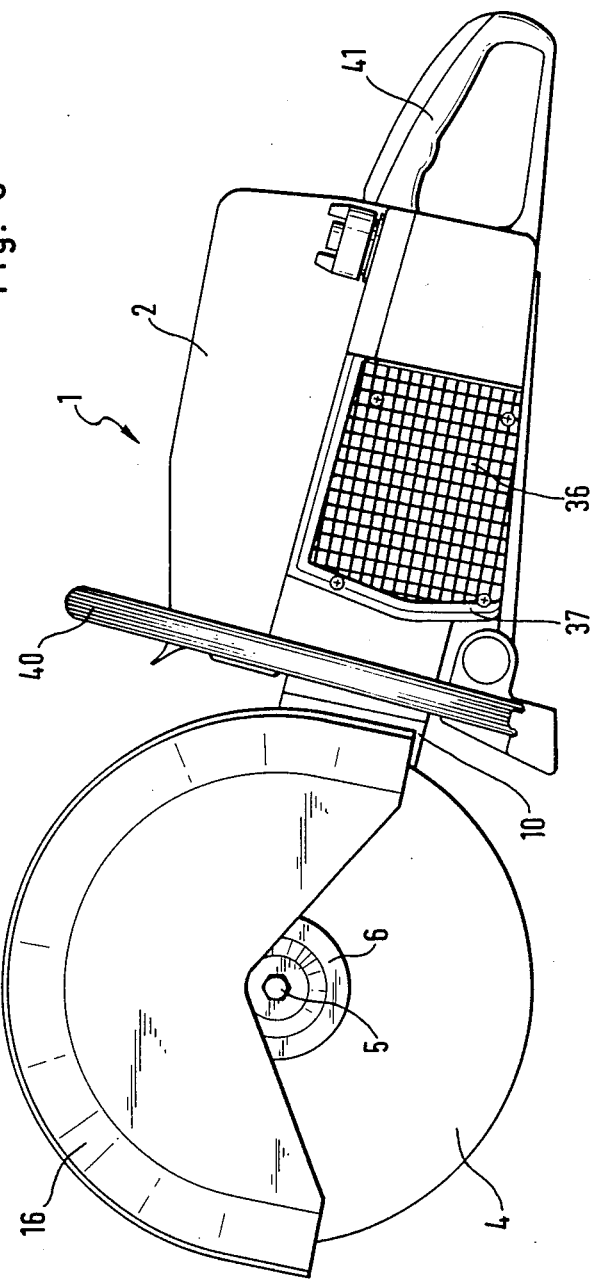

PORTABLE HANDHELD POWER-DRIVEN TOOL

FIELD OF THE INVENTION

The invention relates to a portable handheld power-driven tool such as a cutoff machine. The cutoff machine has an internal combustion engine with a drive shaft. A fan wheel is mounted on one end of the drive shaft and a drive wheel for a work tool is mounted on the other end thereof.

BACKGROUND OF THE INVENTION

In tools of this type, such as cutoff machines or the like, the starting device is located on the side of the fan wheel on the drive shaft and usually the fan wheel is integrated into the starting device. The starting device is generally located in the center of the fan wheel so that the ventilation screen is substantially annular. During abrasive cutting, a considerable cloud of abrasive dust is frequently produced, which is drawn in by the fan wheel and supplied with the cooling air stream to the combustion engine. While the dust supplied with the cooling air to the combustion engine is largely blown out again after flowing around the cylinder, considerable quantities of dust are deposited in the region of the starting device, which lead to disturbances particularly in the region of the moving parts.

With the arrangement of a rope starter comprising substantially synthetic material, the abrasive dust quickly leads to considerable wear of the rope drum and of the rope until the rope tears. After the cutoff machine has been operating for relatively few hours, substantial defects therefore develop at the rope starter, which make it absolutely necessary to replace the starter. In order to achieve a longer service life of the starter, its synthetic parts must be made from more robust, but more expensive materials, such as magnesium.

SUMMARY OF THE INVENTION

It is the object of the invention to provide a portable handheld power-driven tool such as a cutoff machine wherein the starting device provided achieves a high number of operating hours without using more robust materials.

The invention relates to a portable handheld power-driven tool for driving a work tool such as a cutoff machine. The power-driven tool includes: a housing; an internal combustion engine mounted in the housing and having a drive shaft which is rotatably driven; the drive shaft having first and second ends extending from respective sides of the engine; a drive wheel mounted on the first end of the drive shaft for driving the work tool; a fan wheel mounted on the second end of the drive shaft for generating a flow of air for cooling the engine; and, a starter device mounted at the first end of the drive shaft for acting on the drive shaft for starting the engine.

The separate arrangement of fan wheel and starting device prevents deposits of abrasive dust in the starting device, since the cooling air stream no longer flows around the starting device. Thus, without using highly robust and expensive materials, very long operating times are achieved for a starting device, in particular a rope starter.

Because of the separate location of fan wheel and starting device, the structural limitation with respect to the configuration of the fan wheel and of the ventilation screen, which otherwise exists because of the starting device on the side of the fan wheel, is obviated. Thus, the suction area of the ventilation screen can be increased considerably because of the arrangement of the starting device according to the invention. Accordingly, the in-flow speeds measured at the ventilation screen are appreciably lower in comparison with the prior art. The lower in-flow speeds prevent abrasive dust produced during abrasive cutting from being carried along in a large surrounding region of the ventilation screen. Accordingly, a cooling air stream with reduced dust content is achieved so that also the accumulation of dust and dirt on the cylinder to be cooled is appreciably less.

In addition, it has been determined that the arrangement of the starting device on the output end of the drive shaft of the engine may provide advantages even with inexpert starting attempts. If the cutoff machine is held improperly with the left hand on its front handle and the rope starter is actuated with the right hand, then a moment about the left hand holding the tool occurs when starting the machine. Because of this moment, the cutoff machine tilts outwardly away from the operator and the risk of injury to the operator by the rotating abrasive cutoff wheel is clearly reduced despite improper holding at the time of starting.

BRIEF DESCRIPTION OF THE DRAWINGS

The invention will now be described with reference to the drawings wherein:

FIG. 3 is a side elevation view of the air intake side of the cutoff machine.

DESCRIPTION OF THE PREFERRED EMBODIMENTS OF THE INVENTION

Figure 1:
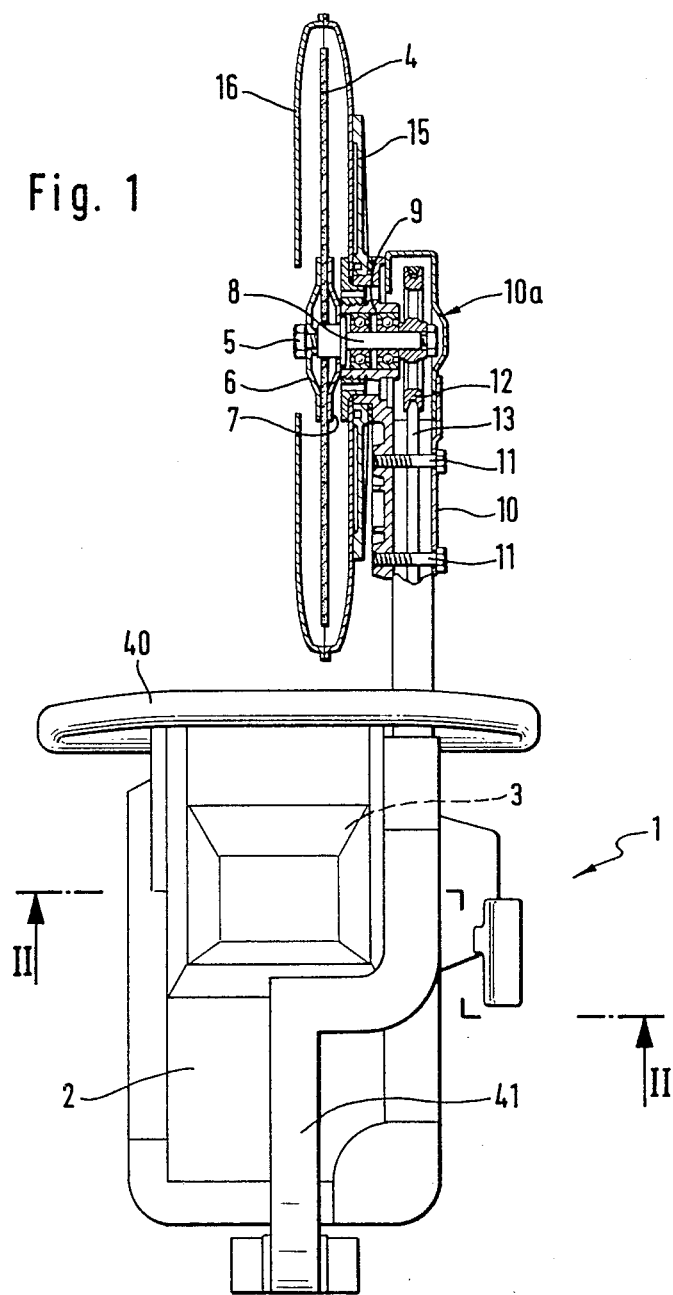
FIG. 1 is a plan view of a cutoff machine with the driving arm shown partly in section.
Figure 2:
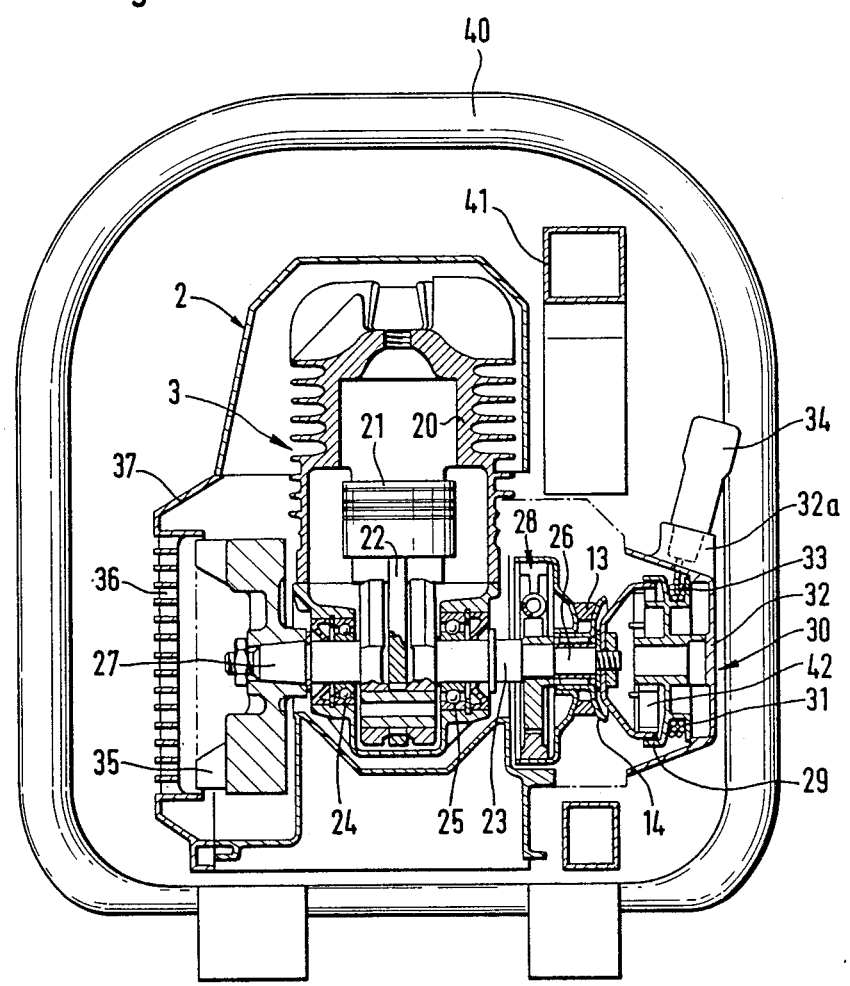
FIG. 2 is a section along line II—II of FIG. 1.

The portable handheld tool shown in FIGS. 1 and 3 is a cutoff machine 1, which essentially includes an internal combustion engine 3 mounted in a housing 2 and a drive arm 10. On the free end 10a of the drive arm 10, a work tool is mounted which here is a rotatably driven abrasive cutoff wheel 4. The cutoff wheel 4 is fixedly attached by means of a nut 5 and clamping discs 6 and 7 to one end of a shaft 8 so as to rotate therewith. The shaft 8 is held by means of ball bearings in a bearing housing 9, which is fixed by screws 11 to the drive arm 10. The end of the shaft 8 located inside the box-like drive arm 10 supports a belt pulley 12. A V-belt 13 is guided over the belt pulley 12 and is disposed in the drive arm 10 closed off from the ambient.

On the bearing housing 9, a retaining flange 15 is provided which supports a wheel guard 16. The wheel guard 16 overlaps the abrasive cutoff wheel 4 over a peripheral angle of approximately 180° and is provided to protect against flying sparks, grinding dust and the like.

The engine 3 is located in the housing 2 of the cutoff machine 1 and is a single cylinder two-stroke engine in the embodiment shown. A piston 21 is located in the cylinder 20 of the engine 3 and is connected by a connecting rod 22 to a crank shaft 23, which operates as the drive shaft. The crank shaft 23 is journalled in bearings 24 and 25 in the region of its ends 26 and 27 in the crankcase wall of the engine 3.

The end 26 of the crank shaft 23 is extended and guided out of the crankcase wall and penetrates a belt pulley 14, which acts as the drive wheel for driving the V-belt 13. The belt pulley 14 is rotatably journalled on the drive shaft 23 and is connected via a clutch 28 to the drive shaft 23 in a torque-transmitting manner. The clutch 28 is preferably a centrifugal clutch, which on reaching a limit speed couples the belt pulley 14 to the drive shaft 23 so as to rotate therewith.

The end 26 of the drive shaft 23 extends through the belt pulley 14 and is connected to a clutch drum 29 of a starting device 30 so as to rotate with the drum. Associated with the clutch drum 29 is a rope drum 31 of a pull starter, which by means of clutch members 42 always cooperates in a power-transmitting manner with the clutch drum 29, when the rope drum 31 rotates faster than the clutch drum 29. When the clutch drum 29 travels faster than the rope drum 31, the clutch members are disengaged so that the rope drum 31 is uncoupled from the clutch drum 29.

The starting device 30 or rope starter is located within the housing 2 of the engine and is enclosed in a substantially dust-tight manner by a cover 32 with respect to the outside. The starter rope 33 is guided to the outside through the cover 32 and connected to a handle 34, which is held by its end facing the rope drum 31 in a cover extension 32a in the stand-by position illustrated.

The other end 27 of the drive shaft 23 supports a fan wheel 35, which is covered by a ventilation screen 36. The ventilation screen 36 is preferably provided in a cover 37 to be fixed to the housing 2 of the engine.

At the end of the housing 2 facing the drive arm 10, the cutoff machine 1 includes a forward bail-type handle 40 which substantially surrounds the housing 2. The handle 40 defines a plane, to which the drive arm 10 extends approximately perpendicularly.

Furthermore, the cutoff machine 1 includes a rear handle 41, which lies perpendicularly to the plane of the handle 40 and is fixed by means of vibration dampers to the engine. The handle 40 is also fixed by means of vibration dampers to the engine.

The belt drive (12, 13, 14) providing the driving connection between the drive shaft 23 and the cutoff wheel 4 is largely enclosed, since the belt pulley 14 lies in the housing of the engine 2 and the flexible drive member, namely the V-belt 13, is guided in the interior of the box-like drive arm to the belt pulley 12.

The arrangement according to the invention of the starting device 30 at the output end of the drive shaft 23 provides almost complete protection from the penetration of abrasive grinding dust so that the starting device can be made especially with plastic parts and achieves a long service life.

Since the starting device 30 is no longer located on the side of the fan wheel, the latter can now be designed exclusively from the point of view of flow performance. The suction area of the ventilation screen 36 is advantageously substantially increased. Instead of an essentially annular suction area due to the arrangement of the starter in the prior art, a larger, substantially rectangular suction area can now be provided, so that the air in-flow speed is reduced in the plane of the ventilation screen 36. The lower air in-flow speed prevents particles of dust from the ambient air from becoming entrained, so that the cooling air stream moved by the fan wheel 35 has a lower dust content than in the prior art.

It is understood that the foregoing description is that of the preferred embodiments of the invention and that various changes and modifications may be made thereto without departing from the spirit and scope of the invention as defined in the appended claims.

What is claimed is:

1. A portable handheld power-driven tool for driving a work tool, the power-driven tool comprising:
    a housing;
    an internal combustion engine mounted in said housing and having a drive shaft which is rotatably driven;
    said drive shaft having first and second ends extending from respective sides of said engine;
    a drive wheel mounted on said first end for driving the work tool;
    a fan wheel mounted on said second end for generating a flow of air for cooling said engine; and,
    a starter device mounted at said first end of said drive shaft for acting on said drive shaft for starting the engine.

2. The portable handheld power-driven tool of claim 1, said drive wheel being mounted on said drive shaft so as to cause said first end to pass through said drive wheel so as to leave an outer end portion extending beyond said drive wheel; and, said starter device including starter means and coupling means for connecting said outer end portion to said starter means when said engine is started.

3. The portable handheld power-driven tool of claim 1, said power-driven tool being a cutoff machine and said cutoff machine further comprising: a mounting structure mounted on said housing and said work tool being rotatably journalled on said mounting structure; a flexible drive member for connecting said drive wheel to said work tool for driving said work tool; said mounting structure being a drive casing which is substantially closed off with respect to the ambient; and, said drive casing being adapted to accommodate said flexible drive member therein.

4. The portable handheld cutoff machine of claim 3, said drive wheel being a drivable pulley and said flexible drive member being a V-shaped drive member.

5. The portable handheld cutoff machine of claim 3, said housing including a compartment substantially closed off from the ambient air for accommodating said starter device therein.

6. The portable handheld power-driven tool of claim 1, said starter device being a rope starter.

* * * * *